(12) United States Patent
Ehinger

(10) Patent No.: US 10,526,081 B2
(45) Date of Patent: Jan. 7, 2020

(54) GEAR SHAFT FOR ACCOMMODATING THERMAL EXPANSION AND TRANSMISSION SYSTEM INCORPORATING THE SAME

(71) Applicant: Bell Helicopter Textron, Inc., Fort Worth, TX (US)

(72) Inventor: Ryan Thomas Ehinger, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 38 days.

(21) Appl. No.: 15/375,133

(22) Filed: Dec. 11, 2016

(65) Prior Publication Data

US 2018/0162524 A1    Jun. 14, 2018

(51) Int. Cl.
*B64C 27/14* (2006.01)
*F16H 57/021* (2012.01)
*F16H 57/00* (2012.01)
*F16C 19/26* (2006.01)
*F16C 33/30* (2006.01)
(Continued)

(52) U.S. Cl.
CPC .............. *B64C 27/14* (2013.01); *F16C 19/26* (2013.01); *F16C 33/30* (2013.01); *F16H 57/0018* (2013.01); *F16H 57/021* (2013.01); *F16C 35/063* (2013.01); *F16C 2206/00* (2013.01); *F16C 2361/61* (2013.01); *F16H 2057/02043* (2013.01); *Y10S 384/907* (2013.01); *Y10S 384/9071* (2013.01); *Y10S 464/902* (2013.01)

(58) Field of Classification Search
CPC ... B64C 27/14; F16H 57/021; F16H 57/0018; F16H 2057/02043; F16C 33/62; F16C 2326/43; F16C 2206/60; Y10S 464/902; Y10S 384/9071; Y10S 384/907
USPC .......................................................... 464/178
See application file for complete search history.

(56) References Cited

U.S. PATENT DOCUMENTS 4,557,704 A * 12/1985 Ito ........................... F01D 5/026
4,629,354 A    12/1986 Freese
5,197,808 A     3/1993 Takata
(Continued)

FOREIGN PATENT DOCUMENTS

JP      2304215 A      12/1990
JP     11178274 A *     7/1999
JP     11178274 A       7/1999

OTHER PUBLICATIONS

National Electronics Alloys, Invar, [retrieved from the internet Sep. 25, 2018] <URL:http://www.nealloys.com/invar_invar.php> (Year: 2018).*

(Continued)

*Primary Examiner* — Greg Binda
(74) *Attorney, Agent, or Firm* — Lightfoot & Alford PLLC

(57) ABSTRACT

A gear shaft allows a ceramic bearing to be used in environments where gear steel is desirable for driving a gear. The gear shaft includes a gear region and a bearing region. A bearing can be disposed about the bearing region of the gear shaft. A gear can be disposed about the gear region of the gear shaft. The bearing includes a ceramic material. The gear region of the gear shaft includes gear steel, whereas the bearing region of the gear shaft includes a bearing-region material that has a coefficient of thermal expansion (CTE) that is close to the CTE of the ceramic material.

18 Claims, 5 Drawing Sheets

(51) Int. Cl.
    *F16H 57/02*    (2012.01)
    *F16C 35/063*   (2006.01)

(56)           References Cited

U.S. PATENT DOCUMENTS 5,954,880  A      9/1999   Aoki et al.
    6,601,467  B1 *   8/2003   Futterer ................... F16H 1/20
    7,178,651  B2 *   2/2007   Leon ....................... F16D 43/25
    7,716,838  B2 *   5/2010   Kobayashi ................ B22F 5/10
    9,297,290  B2 *   3/2016   Pantalone, III ......... B64C 27/82
    2011/0030503 A1   2/2011   Ehinger et al.
    2015/0330446 A1  11/2015   Kia et al.

OTHER PUBLICATIONS

European Search Report in related European Application No. 172056533 dated Aug. 9, 2018; 4 pages.
European Exam Report in related European Application No. 17205653.3 dated Oct. 9, 2018; 5 pages.
European Exam Report in related European Application No. 17205653.3 dated Jun. 6, 2019, 4 pages.

* cited by examiner

… … …

GEAR SHAFT FOR ACCOMMODATING THERMAL EXPANSION AND TRANSMISSION SYSTEM INCORPORATING THE SAME

TECHNICAL FIELD

This disclosure generally relates to gear shafts, and more specifically relates to gear shafts that are capable of accommodating thermally expanding bearings, including bearings used in aircraft transmission systems.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
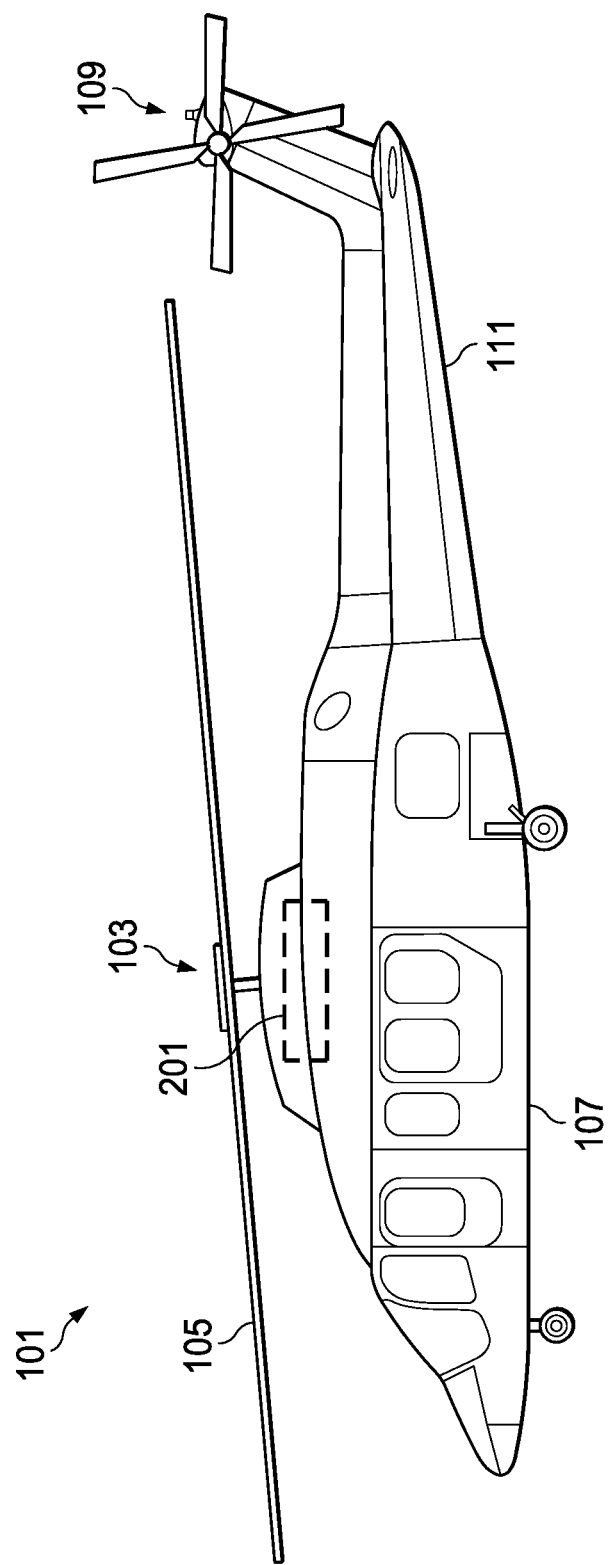
FIG. 1 shows a view of a rotorcraft having a bearing assembly according to the present disclosure.

FIG. 1 shows a schematic diagram of an example rotorcraft 101, which constitutes an example of an aircraft as discussed in this disclosure. Alternative aircraft for purposes of this disclosure can also include tiltrotor aircraft. Rotorcraft 101 has a rotor system 103 with multiple rotor blades 105. The pitch of each rotor blade 105 can be manipulated in order to selectively control direction, thrust, and lift of rotorcraft 101. Rotorcraft 101 can further include a fuselage 107, anti-torque system 109, and an empennage 111. The rotorcraft 101 also includes a transmission 201 for transferring power from one or more rotorcraft engines (not shown) to the rotor system 103. The transmission 201 can also be configured to transfer power from one or more rotorcraft engines to the anti-torque system 109 and other accessories during normal flight conditions. The transmission 201 can also be configured to reduce engine output rpm to optimum rotor rpm. The transmission 201 can also be configured to change the axis of rotation. For example, the rotorcraft 101 can include horizontally mounted engines, in which case the transmission 201 can be configured to change the axis of rotation from the horizontal axis of the engines to the vertical axis of the rotor system 103.

Figure 2:
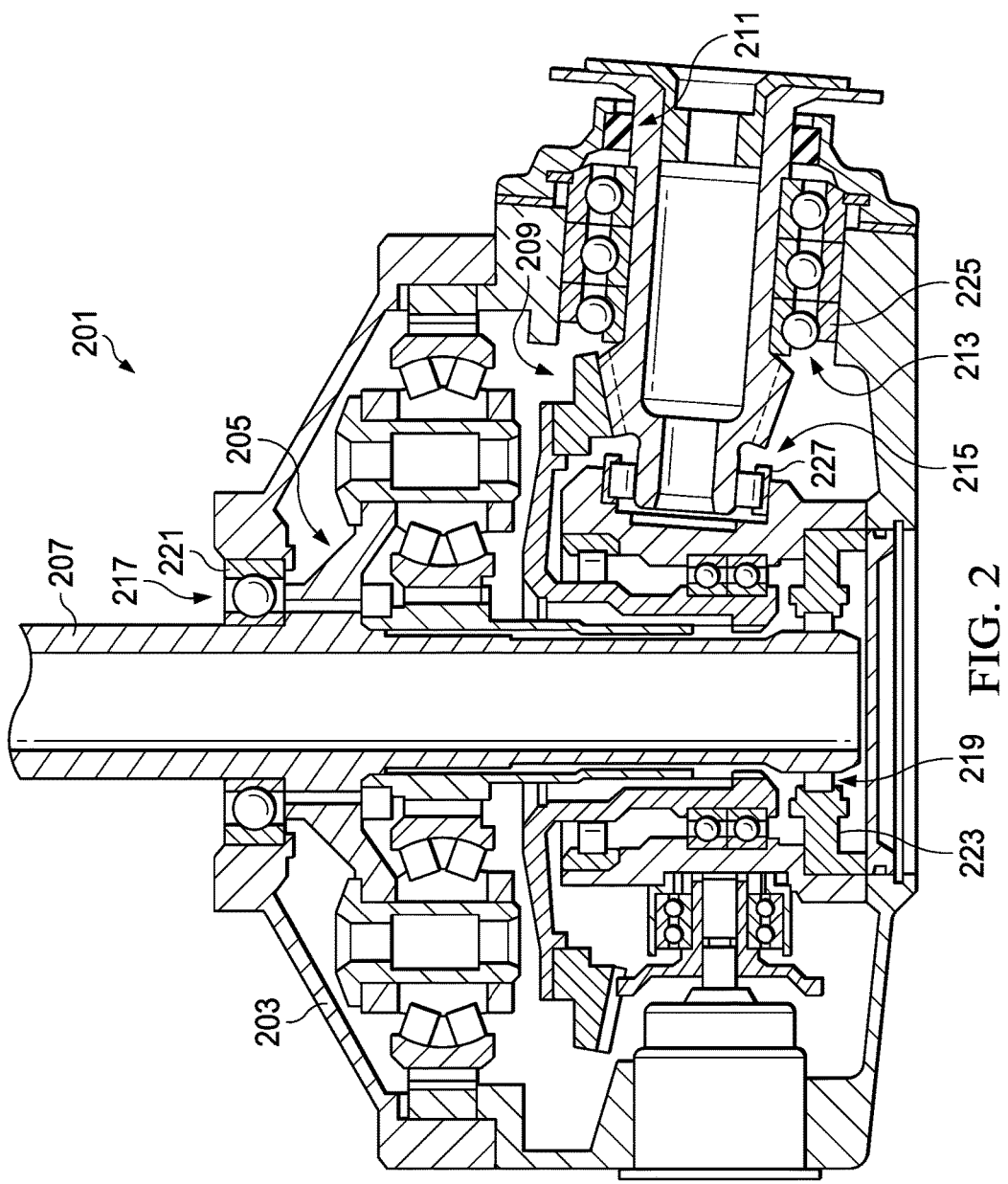
FIG. 2 shows cross-sectional view of an aircraft transmission.

FIG. 2 shows an exemplary illustration of a transmission 201. The transmission 201 includes a plurality of bearing assemblies to support various moving and/or rotating members.

As shown in FIG. 2, transmission 201 includes a housing 203 including a first receiving portion 205 configured to receive a main rotor shaft 207 and a second receiving portion 209 configured to receive a spiral bevel input pinion 211. The spiral bevel input pinion 211 is supported by bearing assemblies 213 and 215. The transmission 201 also includes bearing assemblies 217 and 219 that support the main rotor shaft 207. A main drive shaft (not shown) transfers power from an engine (not shown) to the transmission 201 via the spiral bevel input pinion 211. The main rotor shaft 207 carries power from the transmission 201 to the rotor blades 105.

The transmission 201 also includes a plurality of bearing liners for serving as a wear-resisting layer between the various bearings and their respective support housings. For example, as shown in FIG. 2, bearing liners 221 and 223 are arranged between the bearing assemblies 217 and 219 and the bearing support housing 203. The bearing assemblies 217 and 219 support the main rotor shaft 207 of the rotorcraft 101. Liners 225 and 227 are arranged between the bearing assemblies 213 and 215 and the housing 203 respectively. The bearing assemblies 213 and 215 support the spiral bevel input pinion 211 of the rotorcraft 101.

The various bearings in the transmission 201 can comprise fully or partially ceramic bearings, for example formed of silicon nitride ($Si_3N_4$). In order to accommodate ceramic bearings, the transmission 201 preferably includes apparatus for detecting ceramic debris. Also, many ceramic materials, such as silicon nitride, have a relatively low coefficient of thermal expansion. For example, silicon nitride has a coefficient of thermal expansion that is about ⅓ that of steel and about ⅙ that of aluminum. This presents a difficulty in accommodating ceramic components in bearing assemblies when used in an apparatus formed of metal such as steel or aluminum. For example, it is difficult to incorporate a ceramic bearing race onto a metallic gear shaft without having either unacceptably high case stresses at low temperatures or unacceptably high radial clearing to properly position the bearing at operating temperature. Thus, in order to overcome this difficulty, the present disclosure includes a gear shaft configured for use with ceramic bearings that mitigates the effect of differential thermal expansion between a ceramic bearing race and a gear shaft.

Figure 3:
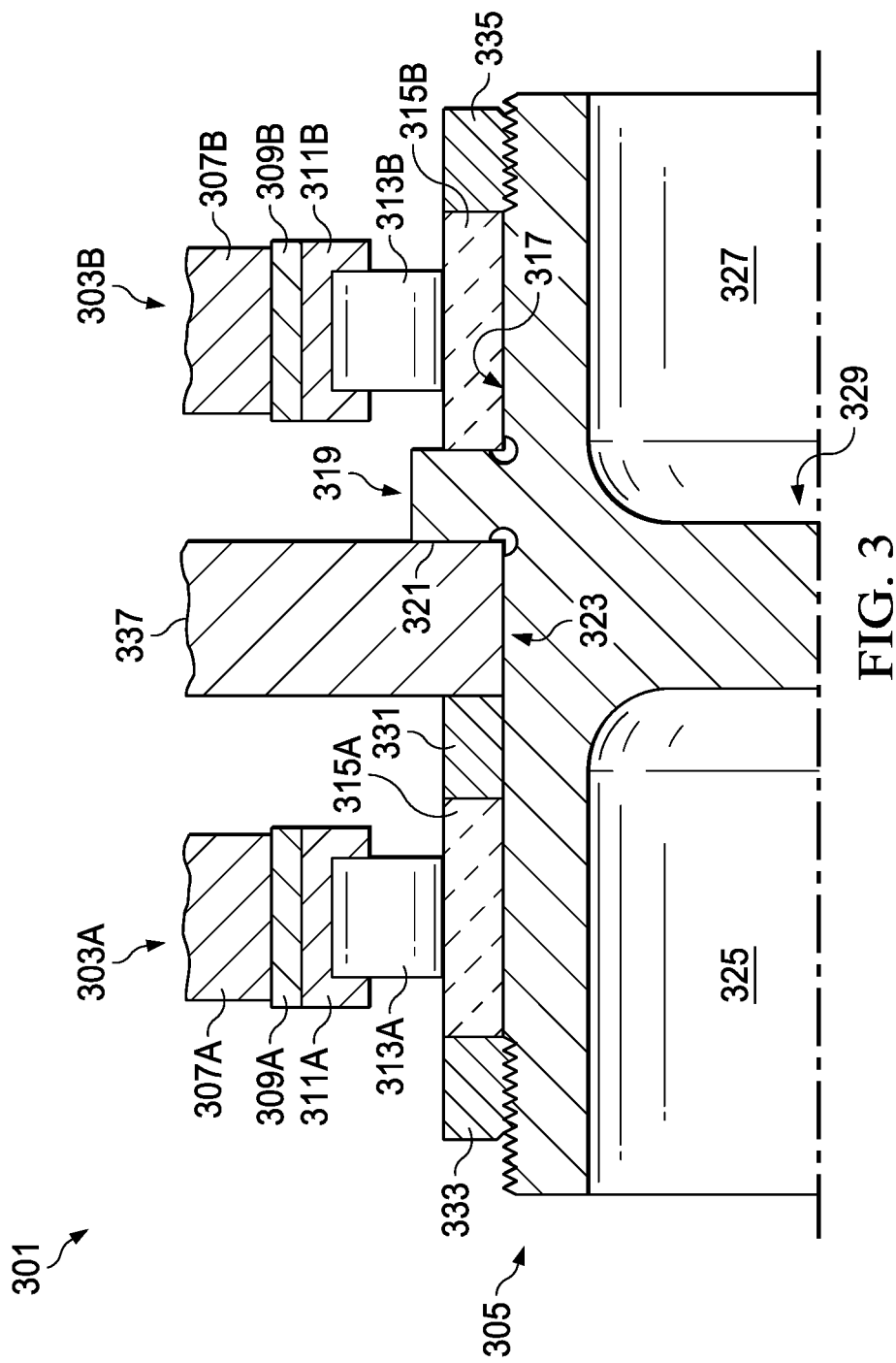
FIG. 3 shows a cross-sectional view of an exemplary embodiment of a gear assembly according to the present disclosure.

FIG. 3 shows a cross-sectional view of an exemplary embodiment of a gear assembly 301. The gear assembly 301 includes a pair of bearing assemblies 303A and 303B for supporting a gear shaft 305. Bearing assembly 303A includes a bearing housing 307A, a bearing liner 309A, an outer race 311A, a plurality of rollers 313A, and an inner race 315A. Bearing assembly 303B includes a bearing housing 307B, a bearing liner 309B, an outer race 311B, a plurality of rollers 313B, and an inner race 315B. While the illustrated embodiment includes cylindrical rollers 313, alternative embodiments can include other types of rollers, such as spherical ball rollers or tapered cylindrical rollers.

The gear shaft 305 defines cylindrical outer surface 317 thereon including a flange 319 defining a shoulder 321, and a gear mounting region 323. The gear shaft 305 also defines a first cylindrical internal chamber 325 and a second cylindrical internal chamber 327, which are interposed by an internal support structure 329. The internal support structure 329 spans the interior of the gear shaft 305 so as to partially define the first and second cylindrical internal chambers 325 and 327. The internal support structure 329 is also aligned with the gear mounting region 323.

Although a sectional view of the lower half (lower as illustrated) of the gear shaft 305 is not shown, such a sectional view would be a mirror image of the upper half (upper as illustrated) of the gear shaft 305 that is shown.

The inner race 315A is mounted on the outer surface 317 of the gear shaft 305 and is urged against a spacer ring 331 and positively held in place by a retaining nut 333. The retaining nut 333 is threadably secured to the gear shaft 305. The inner race 315B is mounted on the outer surface 317 of the gear shaft 305 and is urged against the flange 319 and positively held in place by a retaining nut 335. The retaining nut 335 is threadably secured to the gear shaft 305. An output gear 337 is mounted on the gear shaft 305 against the shoulder 321 with a preselected or standard diametrical press fit therebetween. It should be noted that the output gear 337 is radially aligned with the internal support structure 329 so that the support structure 329 can provide support within the gear shaft 305 against the interference fit of the output gear 337. The spacer ring 331 is mounted adjacent the gear 337 and provides a gap between the output gear 337 and the bearing assembly 303A.

As discussed above, the present application provides for the use of ceramic bearings, for example by allowing for the inner races 315A and 315B to be formed of ceramic material, such as silicon nitride ($Si_3N_4$). In the past, the use of ceramic bearings was problematic, particularly the use of a ceramic inner race on a steel gear shaft, because the ceramic material has relatively low tensile strength and is not particularly resistant to fracture when exposed to high hoop tensile stress. This stress is likely to be caused when a steel gear shaft heats and grows at a much faster rate than the ceramic inner race. To solve this, a more thermally matched material, such as INVAR (generically known as 64FeNi which has a low coefficient of thermal expansion), is used for the gear shaft 305 to support the inner races 315A and 315B of the bearing assemblies 303A and 303B. In the embodiment shown in FIG. 3, the gear shaft 305 is formed of INVAR (generically known as 64FeNi which has a low coefficient of thermal expansion) or other material having a coefficient of thermal expansion (CTE) close to the ceramic material used for the inner races 315A and 315B. For example, INVAR (generically known as 64FeNi which has a low coefficient of thermal expansion) has a CTE of about $1.2 \times 10^{-6} K^{-1}$, while ceramic silicon nitride has a CTE of about $2.8 \times 10^{-6} K^{-1}$. Thus, it is desirable for the material of the gear shaft 305 that supports the ceramic bearing to have a CTE that is at least within $3.5 \times 10^{-6} K^{-1}$ of the CTE of the ceramic forming the bearing, and more preferable for the material of the gear shaft 305 that supports the ceramic bearing assemblies 303A and 303B to have a CTE that is at least within $2.0 \times 10^{-6} K^{-1}$ of the CTE of the ceramic forming the bearing. Thus, the gear shaft 305 is formed of a material that has a CTE that is close to, or substantially the same as, the CTE of the ceramic forming the ceramic bearing assemblies 303A and 303B. In alternative embodiments, such as those shown in FIGS. 4 and 5 and described below, only a portion of the gear shaft is formed of INVAR (generically known as 64FeNi which has a low coefficient of thermal expansion) or other material substantially thermally matched to ceramic material.

Figure 4:
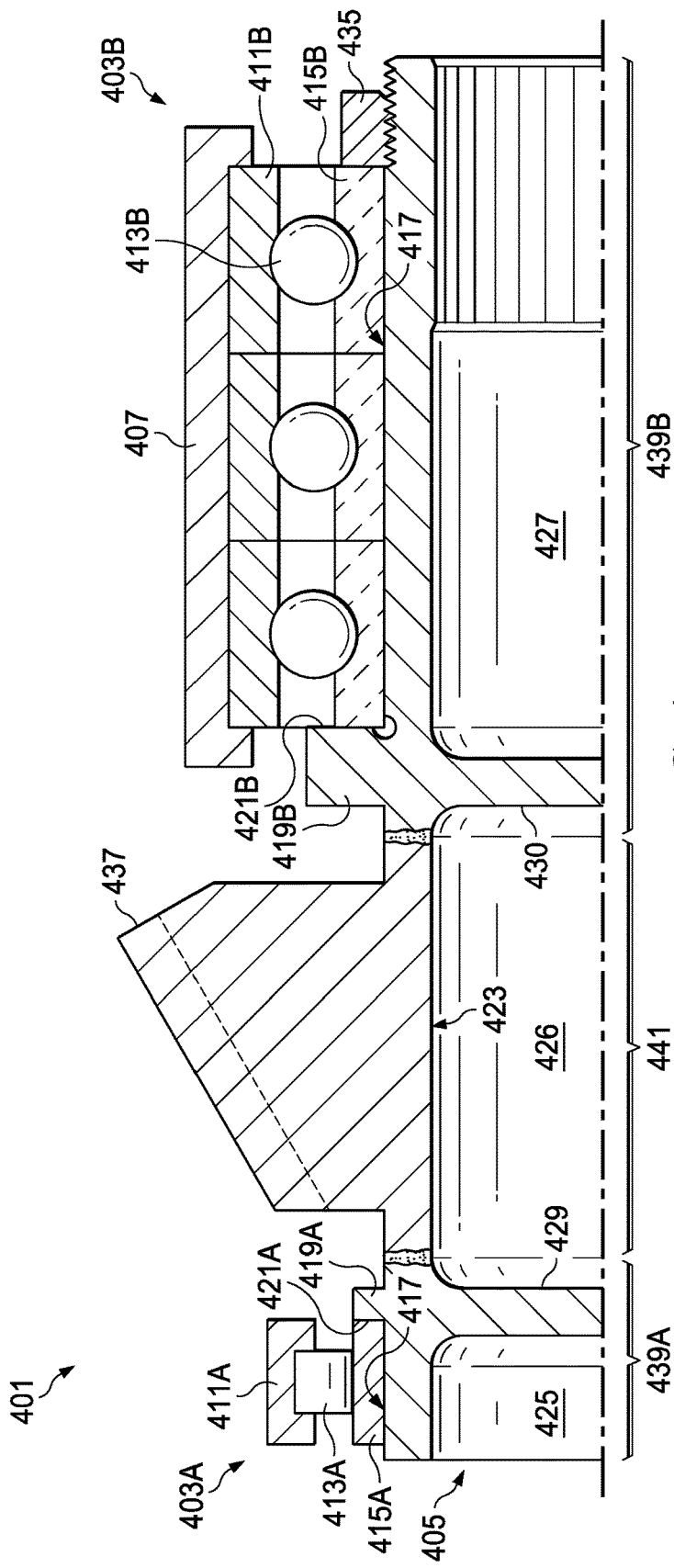
FIG. 4 shows a cross-sectional view of a first alternative embodiment of a gear assembly according to the present disclosure.

FIG. 4 shows a cross-sectional view of an exemplary embodiment of a gear assembly 401. The gear assembly 401 includes a pair of bearing assemblies 403A and 403B for supporting a gear shaft 405. Bearing assembly 403A includes an outer race 411A, a plurality of rollers 413A, and an inner race 415A. Bearing assembly 403B includes a bearing housing 407B, an outer race 411B, a plurality of rollers 413B, and an inner race 415B. While the illustrated embodiment includes cylindrical rollers 413A and spherical rollers 413B, alternative embodiments can include other types of rollers, such as spherical ball rollers or tapered cylindrical rollers.

The gear shaft 405 defines cylindrical outer surface 417 thereon including a first flange 419A defining a first shoulder 421A, a second flange 419B defining a second shoulder 421B, and a gear mounting region 423. The gear shaft 405 also defines a first cylindrical internal chamber 425, a second cylindrical internal chamber 426, and a third cylindrical internal chamber 427. The first and second internal chambers 425 and 426 are interposed by a first internal support structure 429, and the second and third internal chambers 426 and 427 are interposed by a second internal support structure 430. The internal support structures 429 and 430 span the interior of the gear shaft 405 so as to partially define the first, second, and third cylindrical internal chambers 425-427. The first and second internal support structures 429 and 430 are aligned with the first and second flanges 419A and 419B, respectively.

Although a sectional view of the lower half (lower as illustrated) of the gear shaft 405 is not shown, such a sectional view would be a mirror image of the upper half (upper as illustrated) of the gear shaft 405 that is shown.

The inner race 415A is mounted on the outer surface 417 of the gear shaft 405 and is urged against the first flange 419A and can be positively held in place by a retaining nut (not shown). The inner race 415B is mounted on the outer surface 417 of the gear shaft 405 and is urged against the second flange 419B and positively held in place by a retaining nut 435. The retaining nut 435 is threadably secured to the gear shaft 405. An output gear 437 is formed on the gear shaft 405 between the first and second flanges 419A and 419B.

As discussed above, the present application provides for the use of ceramic bearings, for example by allowing for the inner races 415A and 415B to be formed of ceramic material, such as silicon nitride ($Si_3N_4$). In the embodiment shown in FIG. 4, the bearing support regions 439A and 439B of the gear shaft 405 are formed of a material that has a CTE that is at least within $3.5 \times 10^{-6} K^{-1}$ of the CTE of the ceramic forming the inner races 415A and 415B, and preferably within $2.0 \times 10^{-6} K^{-1}$ of the CTE of the ceramic forming the inner races 415A and 415B, such as INVAR (generically known as 64FeNi which has a low coefficient of thermal expansion). Thus, the bearing support regions 439A and 439B are formed of a material that has a CTE that is close to, or substantially the same as, the CTE of the ceramic forming the inner races 415A and 415B. On the other hand, a gear region 441 is formed of a metal such as a hardened gear steel, for example a carburized steel or a nitrided steel such as alloy steel AISI 9310. Thus, the gear shaft 405 constitutes an embodiment of a hybrid gear shaft that includes material such as INVAR (generically known as 64FeNi which has a low coefficient of thermal expansion) with a relatively low thermal expansion coefficient for supporting ceramic bearings, and also includes a gear steel at the gear tooth working or support region.

Numerous methods can be used to mate the ceramic-CTE-matched material used for the bearing support regions 439 to the gear steel material used for the gear region 441 based on the type of gear arrangement. Several methods are disclosed herein, but do not encompass every possible method for accommodating a desirable interface between the two types of material. In the embodiment shown in FIG. 4, the bearing support regions 439 can be attached to the gear region 441 by inertia welding or another type of welding process. Also, in some embodiments, the effect of the thermal growth of the gear steel on the bearing support regions and bearing races can be mitigated by spacing the bearings from the gear as shown in FIG. 4, where gaps are provided between the output gear 437 and each of the first and second flanges 419A and 419B.

Figure 5:
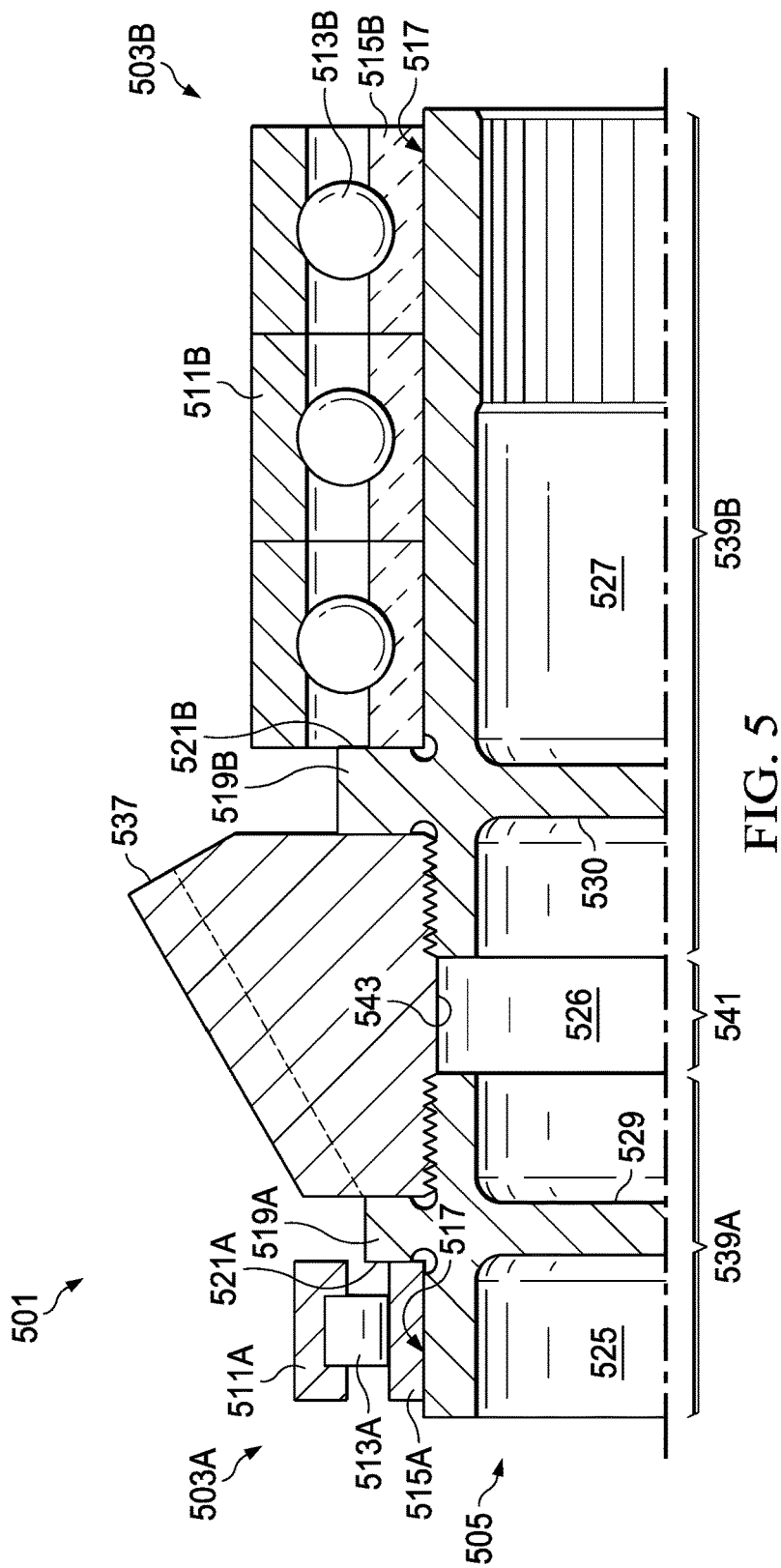
FIG. 5 shows a cross-sectional view of a second alternative embodiment of a gear assembly according to the present disclosure.

FIG. 5 shows a cross-sectional view of an exemplary embodiment of a gear assembly 501. The gear assembly 501 includes a pair of bearing assemblies 503A and 503B for supporting a gear shaft 505. Bearing assembly 503A includes an outer race 511A, a plurality of rollers 513A, and an inner race 515A. Bearing assembly 503B includes an outer race 511B, a plurality of rollers 513B, and an inner race 515B. While the illustrated embodiment includes cylindrical rollers 513A and spherical rollers 513B, alternative embodiments can include other types of rollers, such as spherical ball rollers or tapered cylindrical rollers.

The gear shaft 505 defines cylindrical outer surface 517 thereon including a first flange 519A defining a first shoulder 521A and a second flange 519B defining a second shoulder 521B. The gear shaft 505 also defines a first cylindrical internal chamber 525, a second cylindrical internal chamber 526, and a third cylindrical internal chamber 527. The first and second internal chambers 525 and 526 are interposed by a first internal support structure 529, and the second and third internal chambers 526 and 527 are interposed by a second internal support structure 530. The internal support structures 529 and 530 span the interior of the gear shaft 505 so as to partially define the first, second, and third cylindrical internal chambers 525-527. The first and second internal support structures 529 and 530 are aligned with the first and second flanges 519A and 519B, respectively.

Although a sectional view of the lower half (lower as illustrated) of the gear shaft 505 is not shown, such a sectional view would be a mirror image of the upper half (upper as illustrated) of the gear shaft 505 that is shown.

The inner race 515A is mounted on the outer surface 517 of the gear shaft 505 and is urged against the first flange 519A and can be positively held in place by a retaining nut (not shown). The inner race 515B is mounted on the outer surface 517 of the gear shaft 505 and is urged against the second flange 519B and positively held in place by a retaining nut (not shown). An output gear 537 is threaded onto bearing support regions 539A and 539B of the gear shaft 505 between the first and second flanges 519A and 519B.

As discussed above, the present application provides for the use of ceramic bearings, for example by allowing for the inner races 515A and 515B to be formed of ceramic material, such as silicon nitride ($Si_3N_4$). In the embodiment shown in FIG. 5, the bearing support regions 539A and 539B of the gear shaft 505 are formed of a material that has a CTE that is at least within $3.5\times10^{-6}\,K^{-1}$ of the CTE of the ceramic forming the inner races 515A and 515B, and preferably within $2.0\times10^{-6}\,K^{-1}$ of the CTE of the ceramic forming the inner races 515A and 515B, such as INVAR (generically known as 64FeNi which has a low coefficient of thermal expansion). Thus, the bearing support regions 539A and 539B are formed of a material that has a CTE that is close to, or substantially the same as, the CTE of the ceramic forming the inner races 515A and 515B. On the other hand, a gear region 541 is formed of a metal such as a hardened gear steel, for example a carburized steel or a nitrided steel such as alloy steel AISI 9310. Thus, the gear shaft 505 constitutes an embodiment of a hybrid gear shaft that includes material such as INVAR (generically known as 64FeNi which has a low coefficient of thermal expansion) with a relatively low thermal expansion coefficient for supporting ceramic bearings, and also includes a gear steel at the gear tooth working or support region.

Numerous methods can be used to mate the ceramic-CTE-matched material used for the bearing support regions 539 to the gear steel material used for the gear region 541 based on the type of gear arrangement. Several methods are disclosed herein, but do not encompass every possible method for accommodating a desirable interface between the two types of material. In the embodiment shown in FIG. 5, the bearing support regions 539 can be attached to the gear region 541 by threadably attaching the output gear 537, which includes an internal surface 543 that includes internally-threaded regions, to the bearing support regions 539, which include outer surface 517 that includes externally-threaded regions.

While various embodiments in accordance with the principles disclosed herein have been described above, it should be understood that they have been presented by way of example only, and are not limiting. Thus, the breadth and scope of the claims should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages. Also, the phrases "at least one of A, B, and C" and "A and/or B and/or C" should each be interpreted to include only A, only B, only C, or any combination of A, B, and C.

What is claimed is:

1. A gear assembly comprising:
    a gear shaft having a gear region and a bearing region;
    a first bearing disposed about the bearing region of the gear shaft; and
    a gear disposed about the gear region of the gear shaft,
    wherein the first bearing includes a ceramic material,
    wherein the bearing region of the gear shaft includes a bearing-region material other than the ceramic material that has a coefficient of thermal expansion (CTE) that is within $3.5\times10^{-6}\,K^{-1}$ of the CTE of the ceramic material; and
    wherein the first bearing assembly includes an inner race formed of the ceramic material, the inner race extending about the gear shaft, an outer race extending about the inner race, and a plurality of rollers disposed between the first race and the second race.

2. The gear assembly of claim 1, wherein the ceramic material includes silicon nitride.

3. The gear assembly of claim 1, wherein the bearing-region material includes 64FeNi.

4. The gear assembly of claim 1, wherein the gear shaft defines a first cylindrical internal chamber and a second cylindrical internal chamber interposed by an internal support structure.

5. The gear assembly of claim 4, wherein the internal support structure spans an interior of the gear shaft within the gear region.

6. The gear assembly of claim 1, wherein the gear region is formed of gear steel.

7. The gear assembly of claim 6, wherein the gear steel includes at least one of a carburized steel and a nitrided steel.

8. The gear assembly of claim 1, wherein the bearing region is threadably attached to the gear region.

9. The gear assembly of claim 1, wherein the bearing region is welded to the gear region.

10. A gear shaft for rotatably driving a gear while being rotatably supported by a bearing formed of a ceramic material, the gear shaft comprising:
    a gear region for supporting the gear; and
    a bearing region for supporting the bearing, the bearing region being fixed to the gear region;
    wherein the bearing region includes a bearing-region material other than the ceramic material that has a coefficient of thermal expansion (CTE) that is within $3.5\times10^{-6}\,K^{-1}$ of the CTE of the ceramic material; and wherein the gear shaft defines a first cylindrical internal chamber and a second cylindrical internal chamber interposed by an internal support structure.

11. The gear shaft of claim 10, wherein the ceramic material includes silicon nitride.

12. The gear shaft of claim 10, wherein the internal support structure spans an interior of the gear shaft within the gear region.

13. The gear shaft of claim 10, wherein the bearing-region material includes 64FeNi.

14. The gear shaft of claim 10, wherein the gear region is formed of gear steel.

15. The gear shaft of claim 14, wherein the gear steel includes at least one of a carburized steel and a nitrided steel.

16. The gear shaft of claim 10, wherein the bearing region is threadably attached to the gear region.

17. The gear shaft of claim 10, wherein the bearing region is welded to the gear region.

18. An aircraft comprising:
a rotor assembly comprising a rotor shaft; and
a transmission for driving the rotor shaft, the transmission comprising a gear assembly, the gear assembly comprising:
  a gear shaft having a gear region and a bearing region;
  a first bearing disposed about the bearing region of the gear shaft; and
  a gear disposed about the gear region of the gear shaft,
  wherein the first bearing includes a ceramic material, and
  wherein the bearing region of the gear shaft includes a bearing-region material that has a coefficient of thermal expansion (CTE) that is within $3.5 \times 10^{-6}$ $K^{-1}$ of the CTE of the ceramic material.

* * * * *